March 26, 1929.  F. STIDHAM  1,706,681
SAW HANDLE
Filed Oct. 21, 1925
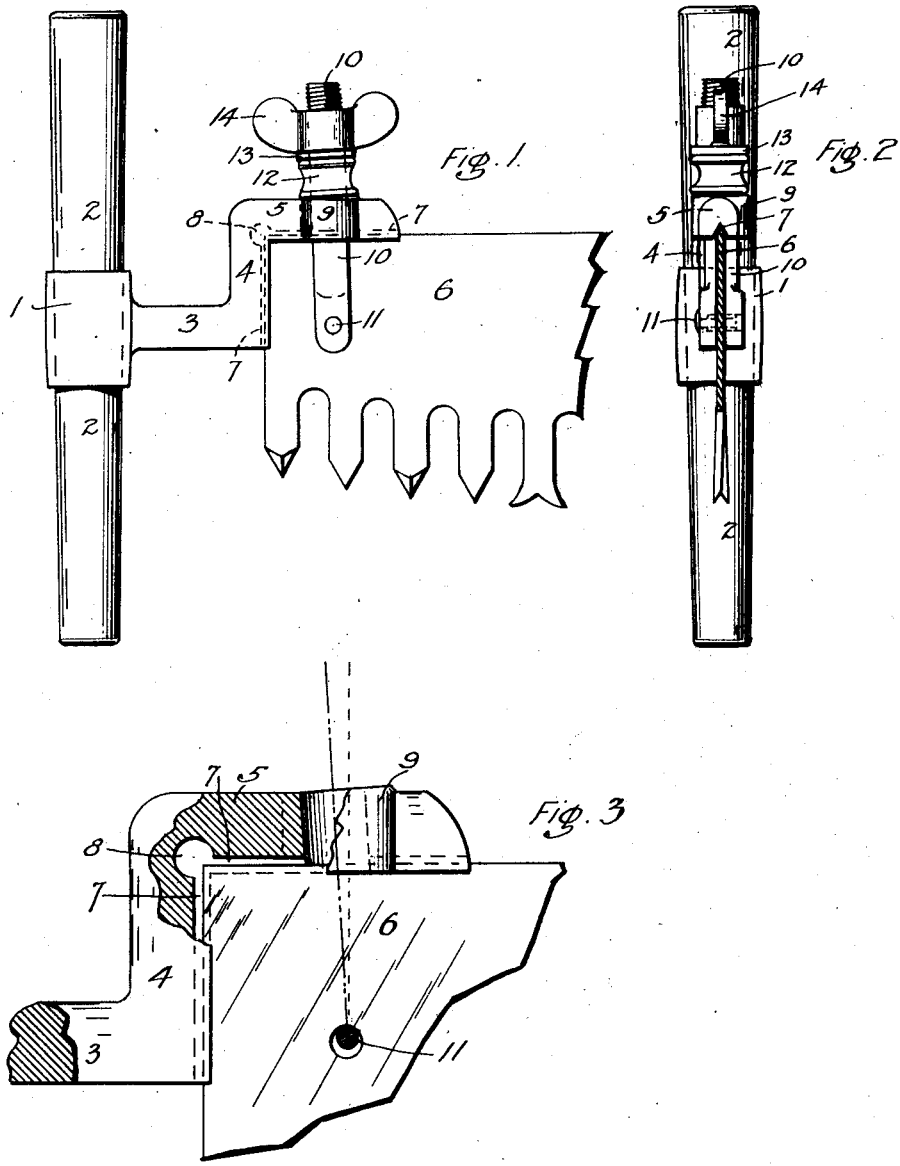
Inventor
Fernando Stidham
By
Attorney Patented Mar. 26, 1929.

1,706,681

UNITED STATES PATENT OFFICE.

FERNANDO STIDHAM, OF SPANAWAY, WASHINGTON.

SAW HANDLE.

Application filed October 21, 1925. Serial No. 63,831.

This invention relates to handles for long woodmen's saws, such as felling and crosscut saw, and has for its object to provide a removable handle which is cheap to make, simple in construction, easy to apply, and firm in use; which is so proportioned and shaped that the working force applied thereto will be transmitted to the saw in the most advantageous position and direction whereby the operation of the saw will be rendered very much easier than in the usual handles now in use; whereby the saw will cut evenly and equally on both the pushing and pulling strokes, with less expenditure of energy; whereby the speed of cutting is materially increased; whereby the wear of the saw is more evenly distributed along the entire working length of the blade; and whereby the balance of feel of the saw is greatly improved, thereby enabling the user to perform his work with greater ease. The handle is also so proportioned and shaped that the hands of the operator are well removed from the saw teeth and from the fastening nut thereby preventing the accidental abrasion of his knuckles, as is commonly the condition in using the handles at present on the market; and so that the handle will not crawl or become loose on the saw during its use.

I attain these and other objects by the devices and arrangements illustrated in the accompanying drawings, in which, Fig. 1 is a side elevation of my improved saw handle as applied to a saw; Fig. 2 is an end elevation thereof, the saw being shown in section; and Fig. 3 is an enlarged side elevation of a part thereof, showing a part in section to reveal the construction thereof.

Similar numerals of reference refer to similar parts throughout the several views.

Referring to the drawings my improved saw handle comprises a metal thimble 1, having a vertical axis, and holding a strong vertical wooden handle piece 2 therein, adapted to be gripped by both hands of the operator, in the usual way. A longitudinal shank 3 leads from the center of the thimble 1, being cast integral therewith, in a horizontal direction and is about two inches long. This shank terminates in a vertical extenson comprising the end piece 4, and this portion may be about one-and-a-half inches long, or slightly longer, and it in turn ends in a horizontal extension comprising the back piece 5. The said parts 3, 4 and 5 form thus a single member in which the parts 3 and 5 are parallel but offset one from the other, and adapted to engage the back and end of the saw blade 6 in the angle between the parts 4 and 5. The surfaces of the said parts 4 and 5, which thus engage the end corner of the saw, are grooved by a triangular or rather V-shaped groove 7, lying substantially in the central plane therof and adapted to receive the end edges of the saw 6 to prevent the saw from any side motion in the handle. The junction of the two portions of the groove 7 is provided with a small cavity 8 at the corner, thus permitting the corner of the saw to enter therein and permitting the two parts 4 and 5 to be drawn into close and tight contact with the end edges of the saw without interference with the corner thereof. The back part 5 of this handle is provided with a boss 9 through which the fastening bolt 10 passes to hold the handle on the saw and to clamp it thereon.

This bolt 10 has a split shank adapted to lie on each side of the saw blade 6 and through which the usual pin 11 passes, whereby it is secured to the saw blade. The bolt 10 passes thence upward, at a rearward inclined angle, through the boss 9. A deep washer 12 is placed over the bolt 10, above the boss 9, and a leather washer 13 is placed above the washer 12. A thumbnut 14 screws down on the bolt 10 and engages the washer 13 and draws the handle on to the saw at a forward-downward angle, thus insuring perfect contact between the back and end edges of the saw blade and the sides of the groove 7 in both the parts 4 and 5 of the handle.

It will be observed that the shank 3 comes well down the saw blade and this is the most practical position thereof since it brings the direction and position of the force applied to the handle by the lower hand (the upper hand is used mostly for steadying the saw in such long saws) in line with the cutting portion of the teeth of the saw at the point of contact of said teeth with the log, thus causing all said force to be applied parallel with and in line with the cutting action and not wasting it by bearing down on the cutting teeth, as is the effect of the usual saw handle. This fact also permits the same force on the pulling stroke to be effective in cutting the wood, instead of making the pulling stroke practically an idle stroke as in the usual construction of saw handles. Thus both strokes of the saw are utilized to their best advantage for cutting the wood, and in neither of them is any of the applied force wasted in moving the saw uselessly or in forcing the saw down into the log.

It will be observed that the parts 3, 4 and 5, which are formed in a single integral piece, have all their outer or exposed edges and corners well rounded so that the operator may grasp the back of the saw or the metal fitting at any point without danger of chafing or abrading his hand, especially as the washer 12 is deep enough to raise the thumb nut 14 out of contact with the hand. Further, it will be seen in Figs. 1 and 3 that the upper surface of the boss 9 is inclined in a rearward-downward direction, or substantially at right-angles to the direction in which the bolt 10 lies.

Having therefore described my invention, what I claim is:—

The combination with a saw blade having a substantially rectangular rear-upper corner and an opening spaced therefrom in a diagonal direction; of a Z-shaped metallic one-piece structure having three consecutive parts, the two end parts lying in vertically displaced planes and joined by the vertical central part, the central part and the upper-forward part of said structure being provided with coplanar V-shaped grooves adapted to receive the said rear-upper corner of said saw blade, the said upper-forward part of said structure having a rearwardly inclined opening therethrough, positioned vertically over the saw blade and directed towards said opening in the saw blade in a downward-forward inclined direction, the upper surface of said part being inclined in a plane at right angles to the incline of said opening, the lower-rearward part of said structure extending rearward from the lower end of said vertical central part at a point substantially midway between the cutting edge of the saw teeth and the back thereof, and terminating in a vertical socket; a vertical handle rigidly secured in said socket; a split bolt spanning said saw blade and passing through said inclined opening in said upper-forward part of said structure; a pin passing through the tines of said split bolt and through the opening in said saw; and a nut on said split bolt and engaging said inclined surface on the upper side of said upper-forward part of said structure, whereby said saw blade is drawn upward into the groove in the upper-forward part and rearward into the groove of the central vertical part.

FERNANDO STIDHAM.